United States Patent
Ramian et al.

(10) Patent No.: US 12,355,502 B2
(45) Date of Patent: Jul. 8, 2025

(54) MEASUREMENT APPLICATION DEVICE CALIBRATION UNIT, MEASUREMENT SYSTEM, METHOD

(71) Applicant: Rohde & Schwarz GmbH & Co. KG, Munich (DE)

(72) Inventors: Florian Ramian, Karlsfeld (DE); Alexander Roth, Dorfen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 116 days.

(21) Appl. No.: 18/340,358

(22) Filed: Jun. 23, 2023

(65) Prior Publication Data

US 2024/0039647 A1     Feb. 1, 2024

Related U.S. Application Data

(63) Continuation-in-part of application No. 17/815,757, filed on Jul. 28, 2022.

(30) Foreign Application Priority Data

Dec. 23, 2022   (EP) ..................................... 22216419

(51) Int. Cl.
    *H04B 17/21*      (2015.01)
    *H04B 17/00*      (2015.01)

(52) U.S. Cl.
    CPC ......... *H04B 17/21* (2015.01); *H04B 17/0085* (2013.01)

(58) Field of Classification Search
    CPC ............................ H04B 17/21; H04B 17/0085
    See application file for complete search history.

(56) References Cited

U.S. PATENT DOCUMENTS 8,508,241 B2    8/2013   Heuermann
9,111,603 B1 *   8/2015   Wang ..................... G11C 5/147
(Continued)

OTHER PUBLICATIONS

Ambatali, "Implementation of an Oscilloscope Vector Network Analyzer for Teaching S-Parameter Measurements", IEEE, 2018, 5 pages.

(Continued)

*Primary Examiner* — Dominic E Hawkins
(74) *Attorney, Agent, or Firm* — BROOKS KUSHMAN P.C.

(57) ABSTRACT

A measurement application device calibration unit, system, and method includes at least one coupling element comprising a first and second connections for coupling the coupling element into a signal measurement path that is coupled to a measurement application device, and a third connection, wherein the coupling element is configured to at least one of couple out a signal from the signal measurement path into the third connection, and couple in a signal from the third connection into the signal measurement path, and a signal processing device that is coupled to the third connection of the coupling element and that is configured to receive a predetermined calibration signal when the coupling element couples out a signal from the signal measurement path into the third connection, and to generate a predetermined known calibration signal when the coupling element couples in a signal from the third connection into the signal measurement path.

15 Claims, 11 Drawing Sheets

(56) References Cited

U.S. PATENT DOCUMENTS

| | | |
|---|---|---|
| 10,805,015 B1 | 10/2020 | Dressel et al. |
| 10,969,421 B2 | 4/2021 | Anderson et al. |
| 2012/0109566 A1 | 5/2012 | Adamian |
| 2013/0076343 A1* | 3/2013 | Carpenter ................ G01R 1/22 |
| | | 324/252 |
| 2016/0061870 A1 | 3/2016 | Vaculik et al. |
| 2017/0257240 A1 | 9/2017 | Ma et al. |
| 2018/0052185 A1* | 2/2018 | Kniffin ................ G01D 18/008 |
| 2018/0372779 A1 | 12/2018 | Peschke |
| 2020/0103485 A1 | 4/2020 | Anderson et al. |
| 2022/0200616 A1 | 6/2022 | Camponeschi et al. |

OTHER PUBLICATIONS

Perotoni et al., "Conversion of Scattering Parameters to Time-Domain for Imaging Applications: Rules and Examples", Journal of Communication and Information Systems, 2021, p. 62-69, vol. 36, No. 1.

* cited by examiner

MEASUREMENT APPLICATION DEVICE CALIBRATION UNIT, MEASUREMENT SYSTEM, METHOD

CROSS-REFERENCE TO RELATED APPLICATIONS

This application is a continuation-in-part of U.S. application Ser. No. 17/815,757 filed Jul. 28, 2022, and also claims priority to European Application Serial No. 22216419.6 filed Dec. 23, 2022, the disclosures of which are hereby incorporated in their entireties by reference herein.

TECHNICAL FIELD

The disclosure relates to a measurement application device calibration unit, a measurement system, and a respective method.

SUMMARY

Although applicable to any measurement system, the present disclosure will mainly be described in conjunction with calibration of vector signal generators and vector signal analyzers and the respective measurement applications.

When performing measurements in electronic applications with e.g., measurement instruments, such as vector signal generators, vector signal analyzers, and oscilloscopes, users have specific requirements concerning the measurement uncertainty, especially the frequency response. Usually, the desired frequency response should deviate from an optimal frequency response as little as possible i.e., the graph showing the frequency response should exactly show the DUT's frequency response, without any influence of the measurement setup.

There exist calibration techniques for calibrating measurement equipment. However, the existing calibration techniques are usually complex to perform and provide a limited calibration quality.

Accordingly, there is a need for providing simplified calibration of measurement equipment.

The above stated problem is solved by the features of the independent claims. It is understood, that independent claims of a claim category may be formed in analogy to the dependent claims of another claim category.

Accordingly, it is provided:

A measurement application device calibration unit, comprising at least one coupling element comprising a first connection and a second connection for coupling the coupling element into a signal measurement path that is coupled to a measurement application device, and a third connection, wherein the coupling element is configured to at least one of couple out a signal from the signal measurement path into the third connection, and couple in a signal from the third connection into the signal measurement path, and a signal processing device that is coupled to the third connection of the coupling element and that is configured to receive a predetermined calibration signal when the coupling element couples out a signal from the signal measurement path into the third connection, and to generate a predetermined known calibration signal when the coupling element couples in a signal from the third connection into the signal measurement path.

Further, it is provided:

A measurement system, comprising at least one measurement application device at least one signal measurement path from at least one of the measurement application devices to a respective reference plane, and a measurement application device calibration unit according to any one of the embodiments of the measurement application device calibration unit presented above or below for at least one of the signal measurement paths, the measurement application device calibration unit being configured to at least one of couple out a predetermined calibration signal from the respective signal measurement path and measure the predetermined calibration signal, and generate a predetermined known calibration signal and couple in the predetermined known calibration signal into the respective signal measurement path, wherein the measurement application device is configured to calibrate the signal measurement path based on the predetermined calibration signal as measured by the measurement application device calibration unit, or the predetermined known calibration signal as coupled into the signal measurement path by the measurement application device calibration unit and measured by the measurement application device.

Further, it is provided:

A method, comprising coupling out a predetermined calibration signal from a signal measurement path and/or generating a predetermined known calibration signal, measuring the coupled-out predetermined calibration signal when the calibration signal is coupled out, coupling in the predetermined known calibration signal into the signal measurement path when the calibration signal is generated, and calibrating the signal measurement path at least one of based on the measured predetermined calibration signal when the calibration signal is coupled out, and based on the known calibration signal as coupled into the signal measurement path, as reflected by a reference plane, and as acquired by a measurement application device that is coupled to the signal measurement path when the calibration signal is generated.

A measurement in a measurement system may be performed for example, using vector signal analyzers, with vector signal generators and with oscilloscopes or other measurement devices, which may be provided in a measurement application, especially each as a dedicated device or as a combined signal generation and signal measurement device. It is understood, that in the context of the present disclosure, the term "measurement application device" may refer to any type of signal generating device and signal acquiring device in a measurement application. As mentioned above, a measurement application device may also comprise both, a signal generating device and a signal acquiring device. Possible measurement application devices may comprise, but are not limited to, a vector signal analyzer VSA, a vector network analyzer, VNA, a vector signal generator, VSG, and an oscilloscope.

Prior to performing a measurement with a measurement setup, the user will usually perform a calibration of the measurement setup.

The calibration serves to minimize the influences of the measurement application devices and other components of the measurement setup, like cables and connectors. A calibration usually tries to optimize the frequency response of the measurement instruments with regard to a reference plane. The reference plane may usually be understood as the last element before the device under test, also called DUT, of the respective signal paths i.e., the signal paths on the input side of the DUT and the signal paths on the DUT output side. Usually, a dedicated reference plane will be defined for each port of any one of the of the measurement application devices used in a measurement application. Such a plane may be well defined, like the plane where the user connects the calibration standards, or such a plane may be theoretically defined and depend on a factory calibration of the respective measurement device.

On the input side of the DUT the frequency response refers to the deviation of the desired input signal for the DUT and the signal that is actually fed into the DUT. The frequency response provided by the test setup on the input side of the DUT may be seen as the "unwanted" frequency response. The DUT itself also has a frequency response on the input side, which is the frequency response that is to be measured, ideally with no influence from the other components. On the output side of the DUT, the frequency response refers to the deviation between the measured signal that is measured by the respective measurement receiver and the output signal that actually leaves the DUT. As above, the frequency response provided by the test setup on the output side of the DUT may be seen as the "unwanted" frequency response. The DUT itself also has a frequency response on the output side, which is the frequency response that is to be measured, ideally with no influence from the other components.

It is understood, that a DUT may comprise only an input side i.e., one or more signal paths on the input side, or only an output side i.e., one or more signal paths on the output side, or a combination of both.

There are two components to the above-explained frequency response. First, an inherent frequency response caused by imperfections from a digital waveform representation of the measurement signal to the RF output, or from an RF input at the measurement receiver to a digital representation of the received signal. Second, a mismatch between the DUT and the measurement application device.

Ideally both components are known and corrected.

The present disclosure provides a measurement application device calibration unit and a respective measurement application device that may both be used in a measurement system according to the present disclosure. The measurement application device calibration unit in conjunction with a respective measurement application device allows identifying the inherent frequency response and the mismatch in a single calibration process.

To this end, the measurement application device calibration unit comprises a coupling element and a signal processing device.

The coupling element may comprise a coupler or splitter and may comprise directional properties i.e., like in a directional coupler or in a directional splitter.

The coupling element may be coupled into a signal path between a measurement application device and the DUT or the reference plane via the first and second connections. A third connection of the coupling element serves to couple in a signal into the signal path or couple out a signal from the signal path. The signal path between the measurement application device and the DUT or the reference plane may also be called the signal measurement path. Such a signal measurement path may comprise internal elements of the measurement application device, cables, connectors, and the like. As will be explained below in more detail, the signal measurement path may be the direct path in the coupling element or the indirect or coupled path in the coupling element.

It is understood, that when calibrating the measurement setup, the DUT will usually not be coupled to the signal measurement path. Instead, respective calibration standards may be coupled to the signal measurement path at the reference plane, as will also be explained in more detail below.

The signal processing device of the measurement application device calibration unit may comprise a signal receiver that acquires a predetermined calibration signal that is provided to the signal processing device via the third connection of the coupling element.

The signal processing device, when comprising a signal receiver, may be used to calibrate the source side of the measurement setup i.e., a measurement signal generator as measurement application device, and a signal path from the measurement signal generator to the reference plane or DUT.

In this mode of operation, the signal processing device acquires the predetermined calibration signal after it is generated by the measurement signal generator and reflected at the reference plane, when performing a possible calibration of the measurement setup.

In addition, or as alternative, the signal processing device may comprise a signal generator that generates a predetermined known calibration signal and provides the generated known calibration signal to the third connection of the coupling device. Such a known calibration signal will then be coupled into the signal measurement path.

The signal processing device, when comprising a signal generator, may be used to calibrate the measurement side of the measurement setup i.e., a measurement device or signal sink as measurement application device, and the signal path between the reference plane or DUT and the measurement device.

In this mode of operation, the measurement device acquires the known calibration signal after it is generated by the signal processing device and reflected at the reference plane, when performing a calibration of a measurement setup.

In the measurement system, in both cases the predetermined calibration signal may be evaluated after it is received in the signal processing device, or the predetermined known calibration signal may be evaluated after it is received in the measurement application device in order to determine calibration parameters for the measurement system i.e., the measurement application device and the respective signal path.

The difference between the predetermined known calibration signal and the predetermined calibration signal is that the properties of the predetermined known calibration signal regarding frequencies, magnitudes and phases are well known over the full relevant frequency range, while the properties of the predetermined calibration signal are not necessarily known. Of course, a digital representation of the predetermined calibration signal may be known, but the analog representation as provided at the output port of a respective signal generator will usually not be known. For the known calibration signal, the analog representation as provided by a respective known signal generated is also known. The known calibration signal may especially comprise a signal with known magnitudes and phases in a predetermined frequency range, especially a comb signal. The relevant frequency range in this context may comprise a predefined frequency range that may be relevant for a respective measurement application or that may be processed by the respective measurement application devices. The relevant frequency range may especially not comprise a single frequency, but a frequency range starting from a first frequency and ranging to a second frequency, wherein the first frequency and the second frequency are distinct.

While the predetermined known calibration signal may be generated with a fully calibrated device that outputs the predetermined known calibration signal as expected, the predetermined calibration signal may be generated with a device that itself is being calibrated e.g., the respective measurement application device. For further calibration, the predetermined calibration signal will be received with a reference receiver, while the known calibration signal will be generated with a known signal generator.

Calibrating or determining calibration parameters in this regard may refer to determining parameters for correcting a mismatch between a first impedance at the reference plane and a second impedance at the reference plane. The first impedance may refer to the impedance that is present when looking from the reference plane towards the DUT. The second impedance, in contrast, may refer to the impedance the is present when looking from the reference plane towards the measurement application device. When both impedances are the same, in case of non-complex or real-valued impedances, or are conjugates, in case of complex or complex-valued impedances, no mismatch is present and there is no need for correcting any mismatch. However, if the first impedance and the second impedance are different, the data that is measured in the measurement setup has to be corrected accordingly.

The determined calibration parameters may then be applied during the signal generation by the measurement application device if the measurement application device is a signal source for the test signal in a test setup, or may be applied to the measured signal if the measurement application device is a signal sink or measurement device in a test setup. As indicated above, a single measurement application device may also generate the test signal and acquire an output signal from a DUT.

With the features of the measurement application device calibration unit and the measurement system it is possible to perform a calibration of the respective signal measurement paths with only one signal processing device that either generates a known calibration signal or receives a predetermined calibration signal. No additional receivers or transmitters are required.

Further embodiments of the present disclosure are subject of the further dependent claims and of the following description, referring to the drawings.

In an embodiment, which can be combined with all other embodiments of the measurement application device calibration unit mentioned above or below, the signal processing device may comprise a reference receiver when the coupling element couples out the predetermined calibration signal from the signal measurement path into the third connection.

In an embodiment, which can be combined with all other embodiments of the measurement application device calibration unit mentioned above or below, the signal processing device may comprise a known signal generator when the coupling element couples in the predetermined known calibration signal from the third connection into the signal measurement path.

In another embodiment, which can be combined with all other embodiments of the measurement application device calibration unit mentioned above or below, the measurement application device calibration unit may comprise two signal processing devices, one with a reference receiver and one with a known signal generator, or a single signal processing device with a reference receiver and a known signal generator. In such an embodiment, two coupling elements may also be provided. The measurement application device calibration unit may, therefore, be used on the DUT input side and the DUT output side.

When used on the input side of the DUT, during a measurement a measurement signal source is present in the form of a respective measurement application device, like a vector signal generator. The predetermined calibration signal may be generated by the measurement signal source and will then be reflected at the reference plane.

In such embodiments, the signal processing device may comprise the reference receiver that receives the reflected predetermined calibration signal via the coupling element. The term "reference receiver" refers to the fact that the electrical parameters of the reference receiver are well known and that the reference receiver is especially used for calibration. The known parameters may refer to the magnitude i.e., the amplitude response, and phase i.e., the phase response, over the full relevant frequency range. This characteristic can also be frequency dependent if the known receiver has a non-linear behavior. This allows taking the characteristics of the reference receiver into account when determining the impedance mismatch such that the reference receiver will only introduce minimal inaccuracies.

When used on the output side of the DUT a measurement device will usually be provided in the form of a respective measurement application device, like a vector signal analyzer or an oscilloscope. In such applications, the known calibration signal may be generated by another device than the measurement application device.

Consequently, the signal processing device may comprise a known signal generator that inputs the known calibration signal into the signal measurement path via the coupling element. The known calibration signal will then be reflected at the reference plane and may be measured by the measurement application device.

The term "known signal generator" refers to the fact that the electrical parameters of the known signal generator, like the frequency response of the known signal generator, are well known and that the known signal generator is only used for calibration. This allows taking the characteristics of the known signal generator and the known calibration signal into account when determining the impedance mismatch such that the known signal generator will only introduce minimal inaccuracies.

In embodiments, which can be combined with all other embodiments of the measurement application device calibration unit mentioned above or below, the measurement application device calibration unit may comprise two sections, a first section for calibrating the input side to a DUT in a measurement setup, and a second section for calibrating the output side of the DUT in a measurement setup. In such embodiments, each section may comprise a dedicated coupling element, and a dedicated signal processing element. As alternative, dedicated measurement application device calibration units may be provided for the input side and the output side of the DUT.

In an embodiment, which can be combined with all other embodiments of the measurement application device calibration unit mentioned above or below, the measurement application device calibration unit may comprise a coupling element comprising a first connection and a second connection for coupling the coupling element into the signal measurement path, and a third connection. The coupling element may be configured to at least one of couple out a signal from the signal measurement path into the third connection, and couple in a signal from the third connection into the signal measurement path. In such an embodiment, the signal processing device may be coupled to the third connection of the coupling element and may be configured to receive the predetermined calibration signal when the coupling element couples out a signal from the signal measurement path into the third connection, and to generate a known calibration signal when the coupling element couples in a signal from the third connection into the signal measurement path.

In an embodiment, which can be combined with all other embodiments of the measurement system mentioned above or below, when the known calibration signal is coupled into the signal measurement path by the measurement application device calibration unit, the known calibration signal may comprise a signal with known magnitudes and phases in a predetermined frequency range, especially a comb signal. For example, the measurement application device calibration unit may comprise a comb generator configured to generate the predetermined known calibration signal as known signal generator, and the measurement application device may comprise a wideband signal acquisition device configured to receive the predetermined known calibration signal.

In another embodiment, which can be combined with all other embodiments of the measurement system mentioned above or below, when the predetermined calibration signal is coupled out from the signal measurement path by the measurement application device calibration unit, the measurement application device calibration unit may comprise a known wideband signal acquisition device configured to receive the predetermined calibration signal, and the measurement application device may comprise a signal generator configured to generate the predetermined calibration signal.

Above the two modes of operation for the measurement system are described, one mode where the calibration is performed on the input side of the DUT, and one mode where the calibration is performed on the output side of the DUT.

When calibrating the input side of the DUT i.e., when the predetermined calibration signal is coupled out from the signal measurement path, a signal generator is present in the measurement application device. Of course, that signal generator may be used to generate the predetermined calibration signal, which may then be acquired by the signal processing device of the measurement application device calibration unit after being reflected at the reference plane. To this end, the measurement application device calibration unit may comprise a wideband signal acquisition device.

When calibrating the measurement setup on the output side of the DUT with respect to the reference plane, no signal generator is present in the measurement application device but a measurement signal receiver is present. Of course, that measurement signal receiver e.g., a wideband signal acquisition device, may be used to acquire the predetermined known calibration signal that is generated by the signal processing device of the measurement application device calibration unit and reflected at the reference plane.

In an embodiment, which can be combined with all other embodiments of the measurement system mentioned above or below, the measurement system may comprise three different calibration standards, especially an open calibration standard, and a short calibration standard, and a matched calibration standard, for each one of the signal measurement paths. The at least one measurement application device may be configured to determine S-parameters of an error network of the respective signal measurement path based on signals acquired while the three different calibration standards are consecutively coupled to the signal measurement path at the reference plane and while the known calibration signal is coupled into the signal measurement path or the predetermined calibration signal is coupled out of the signal measurement path.

S-parameters, also called scattering parameters, are a well-known method of characterizing the electrical behavior of a linear electric network.

Three different conditions need to be provided to calculate the S-parameters for the signal measurement path. These three different conditions may be provided by consecutively coupling different calibration standards to the signal measurement path at the reference plane.

It is understood, that the different calibration standards may manually be coupled to the signal measurement path. As alternative, an automatic calibration standard may be used that controllably couples the required calibration standard to the reference plane.

In order to simplify calculations, the measurement application device may be configured to set one of the S-parameters to 1. One of the S-parameters, usually called S21, for the one port input side of the DUT may be set to 1, since the reflection measurement also comprises the signal traveling towards the reference plane or DUT. In embodiments, after performing a calibration with a through or unknown calibration standard for two signal measurement paths, instead of 1 a respectively determined value may be used.

This results in the error model only comprising three different error parameters or error terms. These error terms may refer to directivity, source match, and reflection tracking. Consequently, three unknown variables need to be determined. A 2-port error network describing a correction of a 1-port measuring device may be used. The error network has 2 ports, because it has an input port and an output port, where the measurement device terminates the chain and, thus, only has 1 port, because the virtual second port can be assumed as the digital side.

To this end, three measurements may be performed with three different calibration standards which provide three different measurement conditions and allow filling in the variables in the respective system of equations.

The so called OSM calibration standards, also called Open, Short, and Match calibration standards, are well known and widely available. Of course, any other three different types of calibration standards with known electrical properties may also be used.

In an embodiment, which can be combined with all other embodiments of the measurement system mentioned above or below, the measurement system may comprise at least two signal measurement paths and one measurement application device calibration unit for each one of the signal paths. In each case two of the signal measurement paths may be coupled to each other via a further calibration standard, especially a through calibration standard or an unknown calibration standard, and the at least one measurement application device may be configured to determine S-parameters of an error network of the respective two signal measurement paths based on signals acquired while the two signal measurement paths are coupled to each other via a through calibration standard.

Using a further calibration standard, the through calibration standard, allows determining a further value or variable for an error network, and, therefore, improves determination of the calibration parameters for the measurement system. With the help of the calibration parameters the reference plane may be moved toward the DUT connection points in the measurement system. The calibration used may comprise a UOSM, also called Unknown Through-Open-Short-Match calibration, or a TOSM, also called Through-Open-Short-Match calibration.

In an embodiment, which can be combined with all other embodiments of the measurement system mentioned above or below, at least one of the signal measurement paths may couple a port of the respective measurement application device with the reference plane via a direct transmission line. The respective measurement application device calibration unit may at least one of couple out a signal from the direct transmission line via a coupling element, and couple in a signal into the direct transmission line via the coupling element.

In this embodiment, the reference plane or the DUT is coupled to the at least one measurement application device via a direct transmission line. In contrast, the measurement application device calibration unit is indirectly coupled to the signal measurement path between the DUT and the measurement application device via a coupling line. The coupling element may comprise directional coupling properties.

In a further embodiment, which can be combined with all other embodiments of the measurement system mentioned above or below, at least one of the signal measurement paths may couple a port of the respective measurement application device with the reference plane via a coupling element. The respective measurement application device calibration unit may at least one of couple out a signal from the signal measurement path via a direct transmission line to the reference plane, and couple in a signal into the signal measurement path via the direct transmission line to the reference plane.

In this embodiment, the reference plane or the DUT is coupled to the at least one measurement application device via an indirect connection e.g., the coupling line in the coupling element. In contrast, the measurement application device calibration unit is directly coupled to the signal measurement path via a direct transmission line. In embodiments, a coupling element with directional coupling properties may be used.

In an embodiment, which can be combined with all other embodiments of the measurement system mentioned above or below, the at least one measurement application device may be configured to perform a noise figure measurement, especially using a cold source method.

In an embodiment, which can be combined with all other embodiments of the measurement application device calibration unit mentioned above or below, the known signal generator may comprise an active calibration signal generator that is couplable to the coupling element and that is configured to generate a predetermined known calibration signal as explained above and input the predetermined known calibration signal into the signal path via the coupling element. The known signal generator may in embodiments refer to a standard and/or be qualified by a national metrology agency that may verify the information about the known calibration signal. The same applies to the reference receiver. A possible national metrology agency may e.g., be the NIST agency.

The measurement application device may be configured to determine a transmission parameter for the signal path via a reflection at the reference plane to the measurement application device based on the known calibration signal and stored information about the known calibration signal, and the measurement application device may be configured to take into account the transmission parameter when calibrating the signal measurement path.

In contrast to the standard OSM-calibration mentioned above where only a product of two S-parameters, usually S12×S21, is determined, with the active calibration signal generator, it is possible to determine each one of the S-parameters of the product independently. In this context, the S-parameters refer to the S-parameters of the 2-port error model and not to the S-parameters of the DUT. Extending a standard 2×1-port VNA calibration with a further standard e.g., a through or an unknown calibration standard to be a TOSM or UOSM, will result in 7 out of the 8 possible error correction terms (4 for each error network, one at each port). The last or eighth error correction term, compared to today's TOSM or UOSM calibration, becomes available through the knowledge of the known calibration signal or the reference receiver.

With the solution of the present disclosure, it is therefore possible to separately determine all four S-parameters for each one of the two different ports or signal paths. After performing the calibration, the single ports or signal paths may, therefore, be used fully calibrated and independently of each other. In contrast, the known OSM calibration for VNAs only allows using the two calibrated ports in combination.

With the active calibration signal generator, the transmission parameter for the signal path from the measurement application device calibration unit to the measurement application device may be determined in advance to performing the calibration of two signal measurement paths with the above-mentioned though calibration standards e.g., in the UOSM or the TOSM calibration. This will improve the quality of the calibration of the measurement system since the influence of the measurement application device calibration unit may be eliminated from the calibration of the signal measurement path with this additional calibration step.

The active calibration signal generator may be any type of signal generator. The only requirement regarding the active calibration signal generator is that it needs to generate the predetermined known calibration signal with predetermined characteristics that must be known on the receiving side.

The stored information about the known calibration signal may for example comprise information about at least one of the amplitudes and the phases of the known calibration signal for specific frequency ranges. Such information may be provided once for the full known calibration signal or separately for different frequency ranges of the known calibration signal.

As alternative, the stored information may also comprise a full description of the known calibration signal. Such a full description may comprise samples of a time line or a time-domain waveform of the known calibration signal with a predetermined resolution. Alternatively, such a full description may comprise samples or description of a waveform of the known calibration signal in the frequency domain.

The active calibration signal generator may in embodiments comprise a comb generator. A comb generator is a special kind of signal generator that produces a signal with multiple harmonics to a base signal. The output signal of such a comb generator when shown in the frequency range shows a pattern that is similar to teeth of a comb, hence the name comb generator. The advantage of using a comb generator is that the known calibration signal may be provided over a large frequency range.

In embodiments, the bandwidth of the active calibration signal generator may be chosen to be at least as large as the bandwidth of the measurement application device.

It is understood, that the measurement application device and the measurement application device calibration unit may comprise any required or adequate component for performing any of the functions described in this disclosure.

When implemented as a signal source or signal generator, the measurement application device may for example comprise respective signal generation elements, like oscillators, amplifiers, attenuators, filters, and digital-to-analog converters. The measurement application device may for example comprise a signal generation section that comprises a digital processing element coupled to a digital-to-analog converter that may be coupled to a respective analog signal modification section. Such an analog signal modification section may for example comprise at least one of amplifiers, attenuators, filters, and connectors.

The same applies to the measurement application device being implemented as a signal sink or signal measurement device. Such a measurement application device may for example comprise respective signal acquisition elements, like analog-to-digital converters, amplifiers, attenuators, and filters. The measurement application device may for example comprise a signal acquisition section that comprises an analog acquisition section that is coupled to an analog-to-digital converter and a digital processing element. The analog acquisition section may for example comprise at least one of connectors, amplifiers, attenuators, and filters.

It is understood, that the measurement application device may comprise further elements, like a user interface with a display and user input means e.g., buttons, (rotary-) knobs, a touchscreen, a mouse, or a keyboard, and other elements, like communication interfaces. The measurement application device may for example be provided as a vector signal analyzer, a vector signal generator, or an oscilloscope.

The functions described in this disclosure that at least in part require determining values based on other values or performing calculations may be implemented at least in part in the above-mentioned digital processing element. These functions may comprise, but are not limited to, performing the calibration e.g., calculating calibration parameters, determining a mismatch between a first impedance and a second impedance, calculating the impedances based on a measured signal, and determining S-parameters.

Although, some functions may be described in this disclosure as being implemented by a dedicated device, for example the measurement application device or the measurement application device calibration unit, it is understood, that these functions may also be performed in another device. Especially, functions that are performed in the digital domain, like the above-mentioned functions, may be performed by any capable device, while the required digital data may be exchanged between the respective devices via digital data interfaces, like a network interface, a Bluetooth interface, a USB interface, a bus interface, or any other digital interface that serves for communicatively coupling digital devices.

A digital processing element according to the present disclosure may be provided as a dedicated processing element, like a processing unit, a microcontroller, a field programmable gate array, FPGA, a complex programmable logic device, CPLD, or the like. The digital processing element may at least in part also be provided as a computer program product comprising computer readable instructions that may be executed by a processing element. In a further embodiment, the digital processing element may be provided as addition or additional function or method to the firmware or operating system of a processing element that is already present in the respective application as respective computer readable instructions. Such computer readable instructions may be stored in a memory that is coupled to or integrated into the processing element. The digital processing element may load the computer readable instructions from the memory and execute them.

In addition, it is understood, that any required supporting or additional hardware may be provided like e.g., a power supply circuitry and clock generation circuitry.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
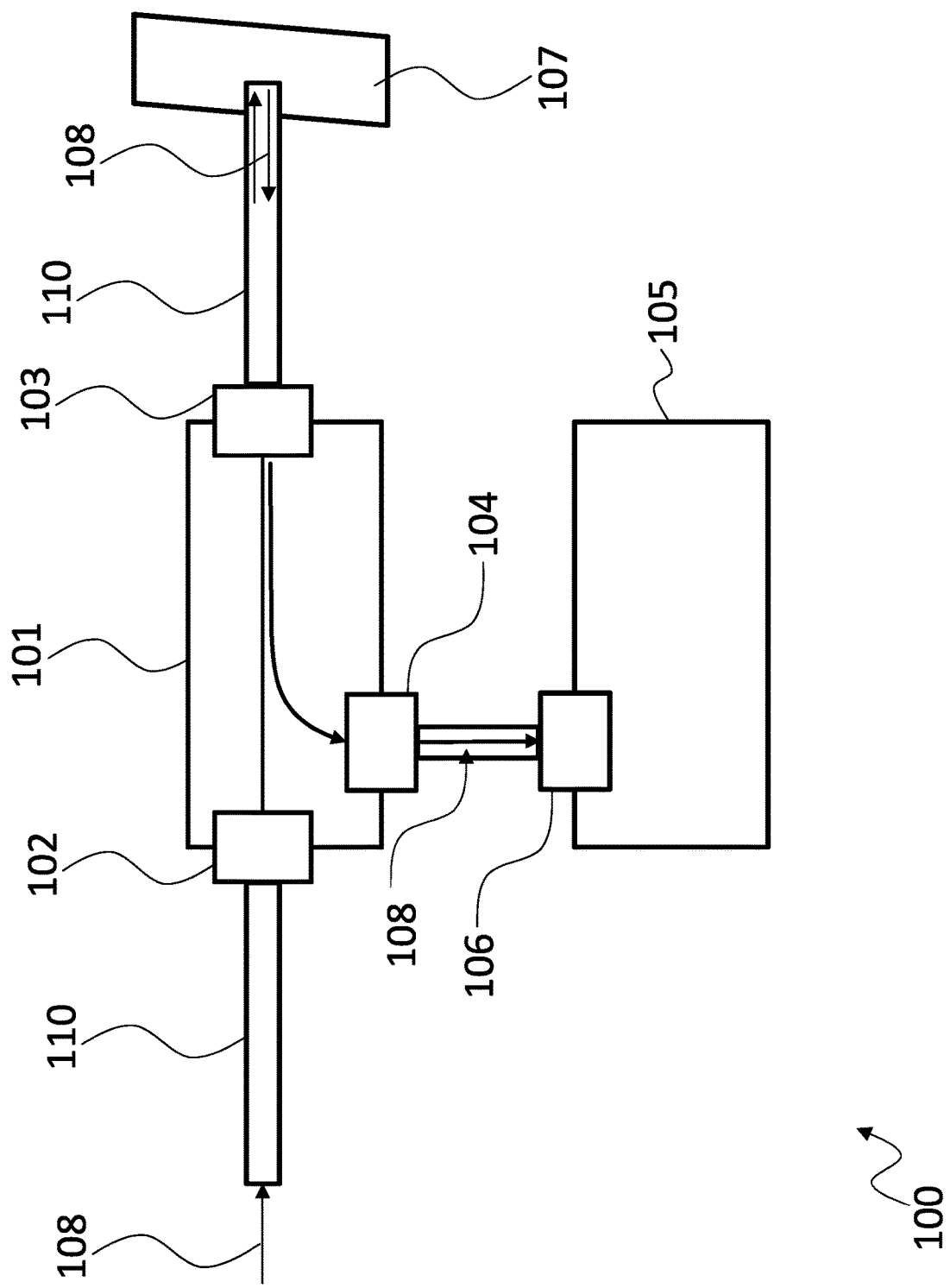
FIG. 1 shows a block diagram of an embodiment of a measurement application device calibration unit according to the present disclosure.

FIG. 1 shows a measurement application device calibration unit 100 that serves for calibrating a DUT input side of a measurement setup i.e., the side that provides a test signal to the DUT when the test is performed.

The measurement application device calibration unit 100 comprises a coupling element 101 that comprises a first connector 102, a second connector 103 and a third connector 104. The third connector 104 is coupled to a connector 106 of a signal processing device 105. The first connector 102 and the second connector 103 are coupled in a signal path 110. The signal path 110 may transport a predetermined calibration signal 108 from a calibration signal source (see FIG. 3) to the reference plane 107. To this end, the signal path 110 may comprise, for example, cables and connectors.

The predetermined calibration signal 108 will be reflected at the reference plane 107, and the coupling element 101 will couple out the reflected predetermined calibration signal 108 and provide the predetermined calibration signal 108 to the signal processing device 105.

For receiving the reflected predetermined calibration signal 108 from the coupling element 101 the signal processing device 105 may for example comprise a respective reference receiver. Any explanations provided regarding the reference receiver above and below apply to such a reference receiver in the measurement application device calibration unit 100.

As explained in the present disclosure, the measurement application device calibration unit 100 may be used in a measurement system (see FIGS. 3-9) to perform a calibration of the measurement system prior to performing a measurement with a DUT.

To this end, the measurement application device calibration unit 100 may comprise a processing element for example, in the signal processing device 105, that may determine the calibration parameters for the signal path 110. Alternatively, the calibration parameters may be determined in a measurement application device.

For determining the calibration parameters for the signal path 110, different calibration standards may be coupled to the signal path 110 at the reference plane 107, as will be explained in more detail in conjunction with FIG. 3.

Figure 2:
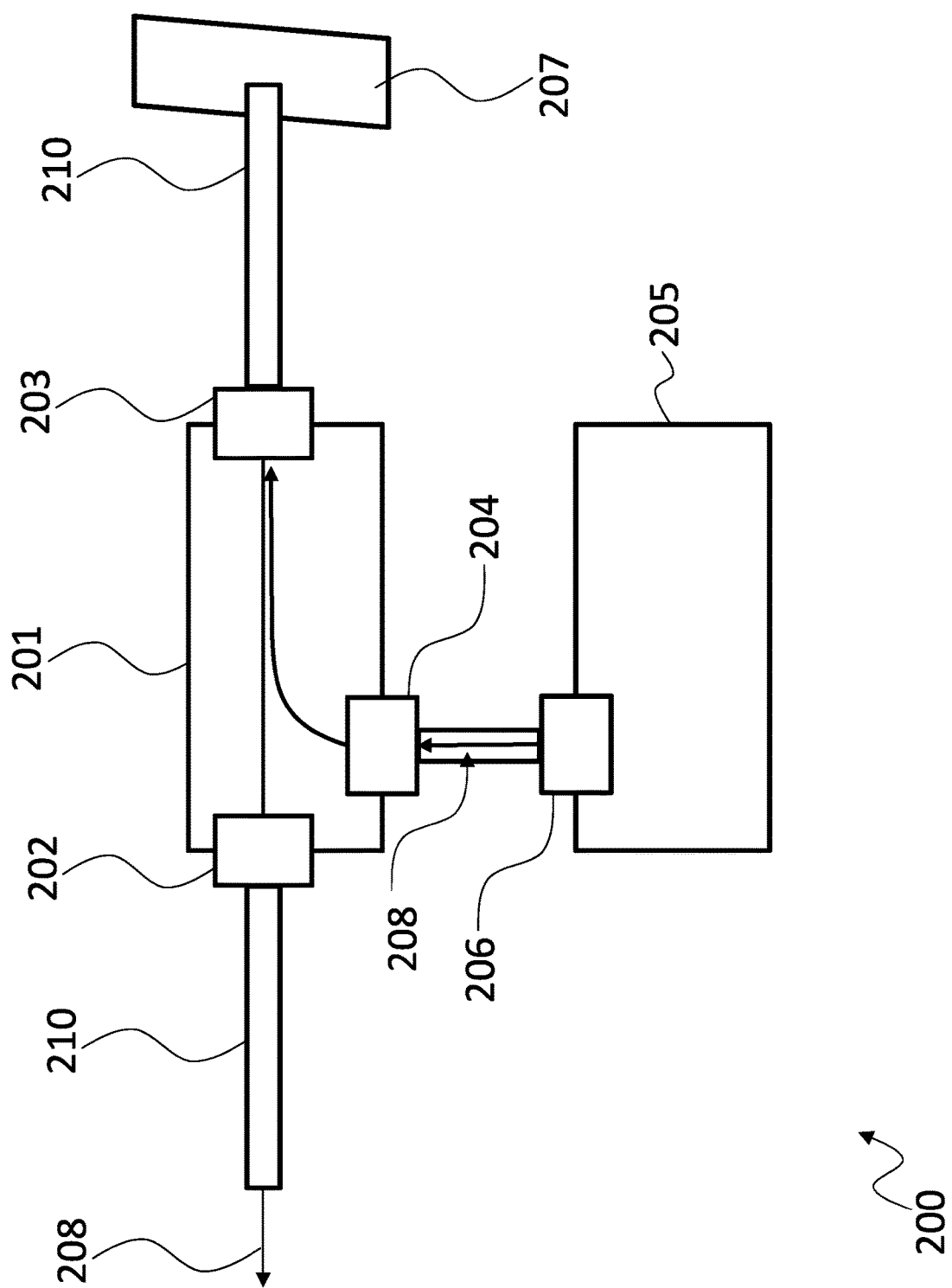
FIG. 2 shows a block diagram of another embodiment of a measurement application device calibration unit according to the present disclosure.

FIG. 2 shows a measurement application device calibration unit 200 that serves for calibrating a DUT output side of a measurement setup i.e., the side that receives a test signal from the DUT when the test is performed.

The measurement application device calibration unit 200 comprises a coupling element 201 that comprises a first connector 202, a second connector 203 and a third connector 204. The third connector 204 is coupled to a connector 206 of a signal processing device 205. The first connector 202 and the second connector 203 are coupled in a signal path 210.

In the measurement application device calibration unit 200, the signal processing device 205 provides the known calibration signal 209, that is coupled into the signal path 210 by the coupling element 201 in the direction of the reference plane 207 for example with a known signal generator. The explanations provided above and below regarding the known calibration signal apply to the known calibration signal 209 of the measurement application device calibration unit 200.

The known calibration signal 209 will be reflected at the reference plane 207, and will travel back through the signal path 210.

The reflected known calibration signal 209 may then be acquired by a measurement application device that comprises a signal sink, like a Vector Signal Analyzer.

As explained in the present disclosure, the measurement application device calibration unit 200 may be used in a measurement system (see FIGS. 5-9) to perform a calibration of the measurement system prior to performing a measurement with a DUT.

To this end, the measurement application device calibration unit 200 may comprise a processing element, for example, in the signal processing device 205, that may determine the calibration parameters for the signal path 210. Of course, such a processing element may also be provided in the respective measurement application device.

For determining the calibration parameters for the signal path 210, different calibration standards may be coupled to the signal path 210 at the reference plane 207, as will be explained in more detail in conjunction with FIG. 4.

Figure 3:
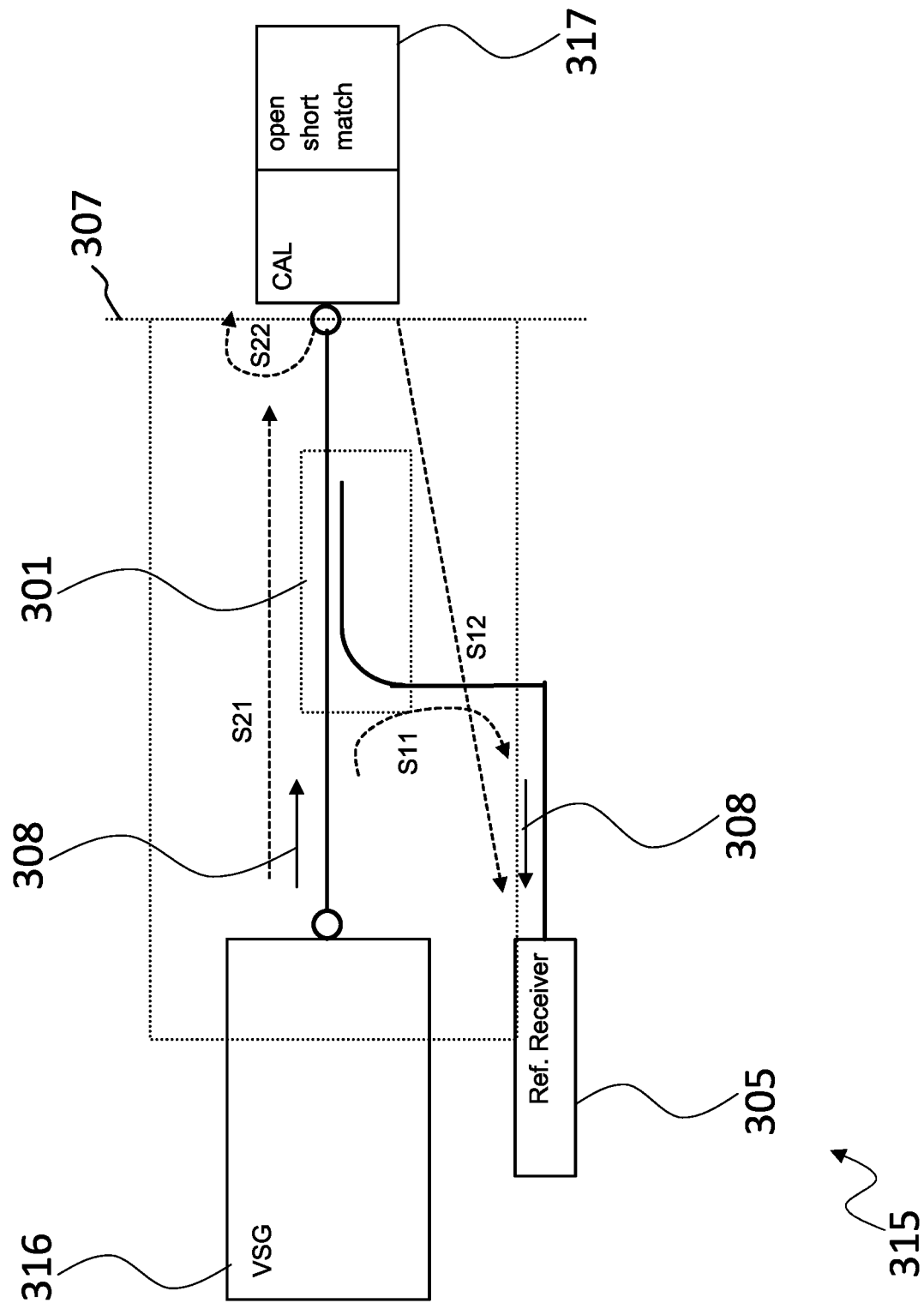
FIG. 3 shows a block diagram of an embodiment of a measurement system according to the present disclosure.

FIG. 3 shows a block diagram of a measurement system 315.

The measurement system 315 comprises a measurement application device calibration unit like the measurement application device calibration unit 100 with a coupling element 301 coupled into a signal measurement path and coupled to a reference receiver 305 as signal processing device. The signal measurement path is arranged between a vector signal generator 316 as measurement application device and a reference plane 307. At the reference plane 307 the measurement system 315 comprises a calibration standard 317. A dotted box covering the output of the vector signal generator 316, the coupling element 301, the reference plane 307, and the connection to the reference receiver 305 depicts the 2-port error network as known from traditional VNA calibration, which is not physically existing. The S-parameters shown in the figure refer to the describing S-parameters of the error network. In an ideal world the following would apply: S11=0, S22=0, S21=1, and S12=1.

In the shown example, the calibration standard 317 may be an automatically switchable calibration standard 317 that may provide different terminations at the reference plane 307. The calibration standard 317 may provide an open termination, a short termination, and a match termination. Of course, in other embodiments, dedicated calibration standards may be provided at least for some of the terminations, and other terminations than open, short and match may be used.

In an exemplary embodiment, the signal measurement path may be calibrated by outputting the predetermined calibration 308 signal from the vector signal generator 316 that will be reflected at the reference plane 307 and provided to the reference receiver 305.

The predetermined calibration signal 308 will then be received by the reference receiver 305 and may be evaluated to determine the transmission characteristics of the signal path from the vector signal generator 316 to the reference receiver 305.

Since the characteristics of the reference receiver 305 are known in detail, any deviation between the predetermined calibration signal 308 as received by the reference receiver 305 and the original predetermined calibration signal as it should be received may be determined. Based on the identified differences, the transmission characteristics of the signal path from the vector signal generator 316 to the reference receiver 305 may be determined.

After performing this first calibration step, in a second calibration step, the signal path between the reference plane 307 and the vector signal generator 316 may be calibrated.

This calibration may be performed by generating a respective predetermined calibration signal 308 in the vector signal generator 316 and outputting the predetermined calibration signal 308 into the signal path. The predetermined calibration signal 308 will then be reflected at the reference plane 307. The reflection of the predetermined calibration signal 308 will then be received by the reference receiver 305 via the coupling element 301.

Measurements for the second calibration may be performed with the three terminations open, short, match configured in the calibration standard 317 consecutively. As explained above, these measurements serve to solve a system of equations for an error network that represents the transmission characteristics of the signal path.

The respective calibration parameters may then be used to adapt the test signal that is provided from the vector signal generator 316 to a DUT when a test or measurement is performed.

Figure 4:
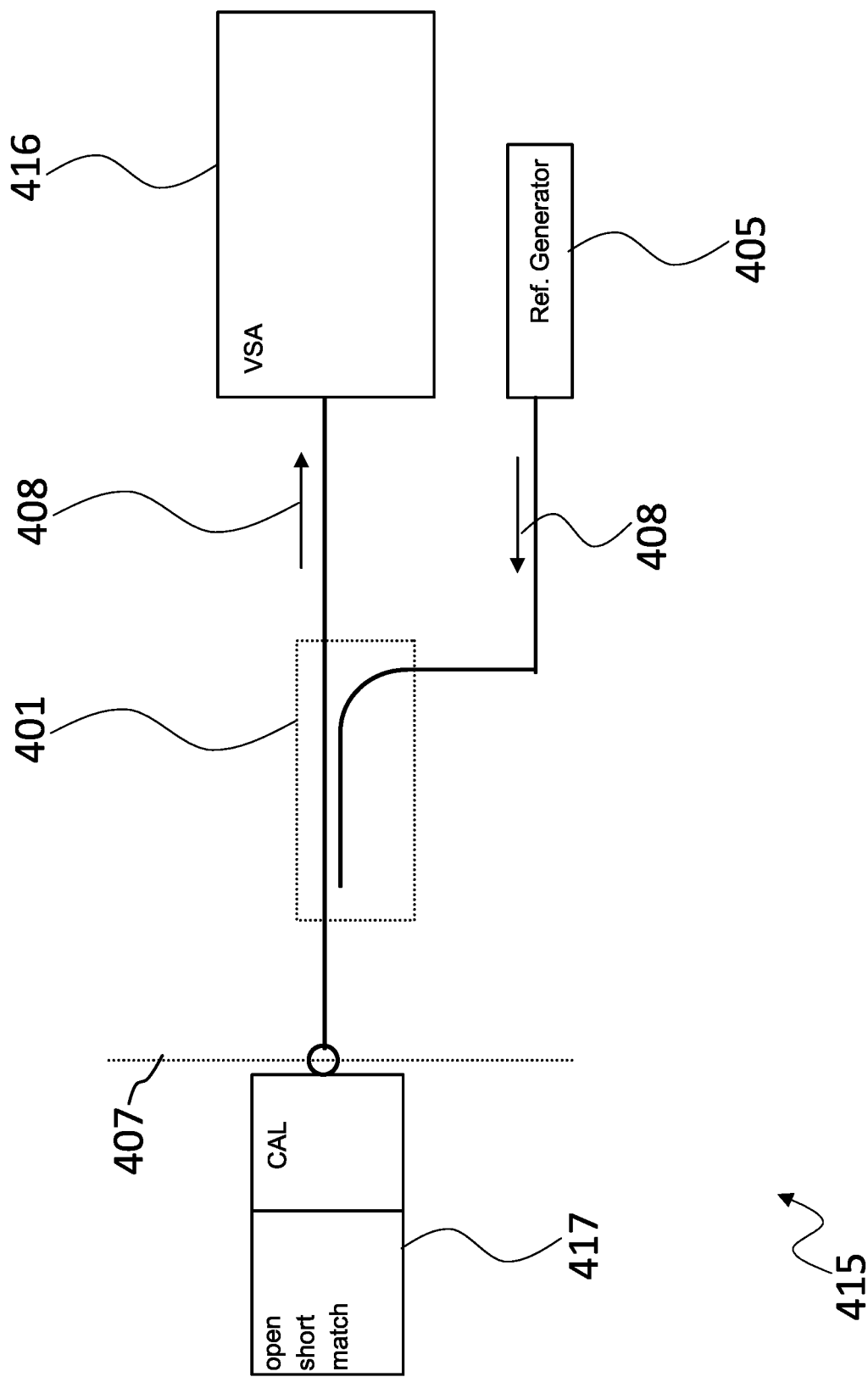
FIG. 4 shows a block diagram of an embodiment of another measurement system according to the present disclosure.

FIG. 4 shows a block diagram of a measurement system 415.

The measurement system 415 comprises a measurement application device calibration unit like the measurement application device calibration unit 200 with a coupling element 401 coupled into a signal measurement path and coupled to a known signal generator 405 as signal processing device. The signal measurement path is arranged between a vector signal analyzer 416 as measurement application device and a reference plane 407. At the reference plane 407 the measurement system 415 comprises a calibration standard 417.

In the shown example, the calibration standard 417 may be an automatically switchable calibration standard 417 that may provide different terminations at the reference plane 407. The calibration standard 417 may provide an open termination, a short termination, and a match termination. Of course, in other embodiments, dedicated calibration standards may be provided at least for some of the terminations, and other terminations than open, short and match may be used.

In an exemplary embodiment, the signal measurement path may be calibrated by first activating the known signal generator 405. In this mode, the vector signal analyzer 416 may acquire the predetermined known calibration signal 409 that may be provided by the known signal generator 405 via a reflection by the calibration standard 417. As explained above, in embodiments, the predetermined known calibration signal 409 may be a comb signal generated by a comb generator in the known signal generator 405.

Since the characteristics of the known calibration signal 409 are known in detail, any deviation between the known calibration signal 409 as received by the vector signal analyzer 416 and the original known calibration signal as it should be received may be determined. Based on the identified differences, the transmission characteristics of the signal path from the known signal generator 405 to the reference plane 407 may be determined, thereby virtually moving the reference plane from the known signal generator 405 to the actual reference plane 407.

After performing this first calibration step, in a second calibration step, the signal path between the reference plane 407 and the vector signal analyzer 416 may be calibrated.

This calibration may be performed by generating a respective known calibration signal 409 in the known signal generator 405 and outputting the known calibration signal 409 into the signal path via the coupling element 401. The known calibration signal 409 will then be reflected at the reference plane 407 and will then be received by the vector signal analyzer 416.

Measurements for the second calibration may be performed with any one of the possible terminations open, short, match configured in the calibration standard 417. As explained above, these measurements serve to solve a system of equations for an error network that represents the transmission characteristics of the signal path.

The respective calibration parameters may then be used to adapt the test signal that is received from the DUT in the vector signal analyzer 416 when a test or measurement is performed.

Figure 5:
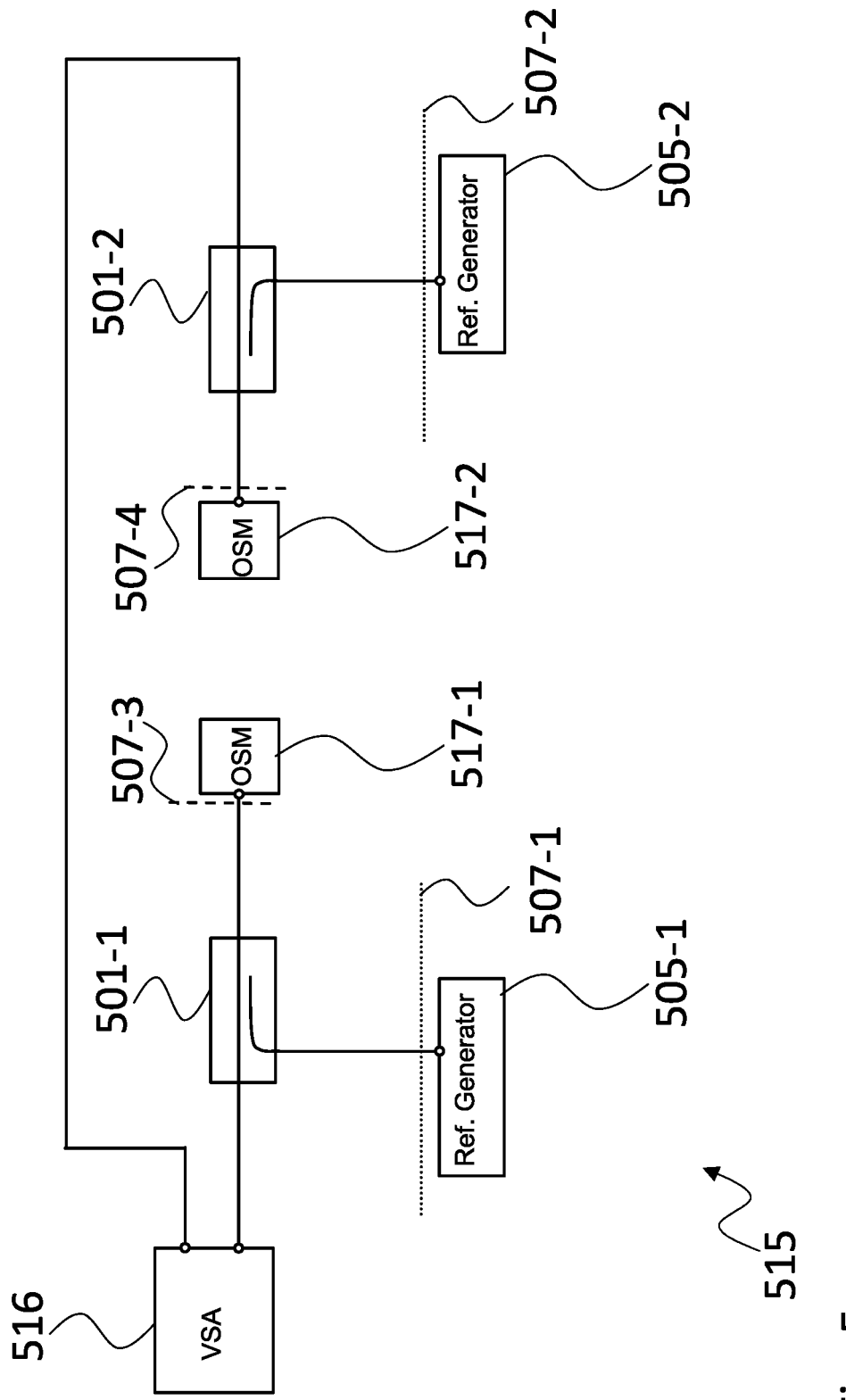
FIG. 5 shows a block diagram of an embodiment of another measurement system according to the present disclosure.

FIG. 5 shows a block diagram of a further measurement system 515. The measurement system 515 is based on the measurement system 415 and doubles the elements of the measurement system 415. Therefore, the measurement system 515 comprises a vector signal analyzer 516 with two input ports. Each one of the two input ports of the vector signal analyzer 516 is coupled to a coupling element 501-1, 501-2. The direct connection through the coupling element 501-1, 501-2 is in each case coupled to a calibration standard 517-1, 517-2. The coupling connection of the coupling elements 501-1, 501-2 is in each case coupled to a reference generator 505-1, 505-2 that forms a known signal generator for the measurement system 515.

In the measurement system 515 four reference planes 507-1, 507-2, 507-3, 507-4 are shown. A reference plane 507-1, 507-2 is shown at each one of the reference generators 505-1, 505-2, and a reference plane 507-3, 507-4 is shown at each one of the calibration standards 517-1, 517-2.

The first calibration step using a reference generator 505-1, 505-2 as explained with regard to the measurement system 415 may be performed for each one of the two input ports of the vector signal analyzer 516. This calibration will allow setting the reference planes for further calibrations and measurement from the reference planes 507-1, 507-2 to the reference planes 507-3, 507-4.

It is understood, that in the measurement system 515, the full calibration as explained with regard to measurement system 415 may be performed for each one of the ports of the vector signal analyzer 516 prior to replacing the calibration standards 517-1, 517-2 with the DUT.

The calibration standards 517-1, 517-2 may comprise an automatically switchable calibration standard with different configurations, for example, open, short, match. Of course, manually exchangeable calibration standards of type open, short, match or any other three different calibration standards may also be used.

Figure 6:
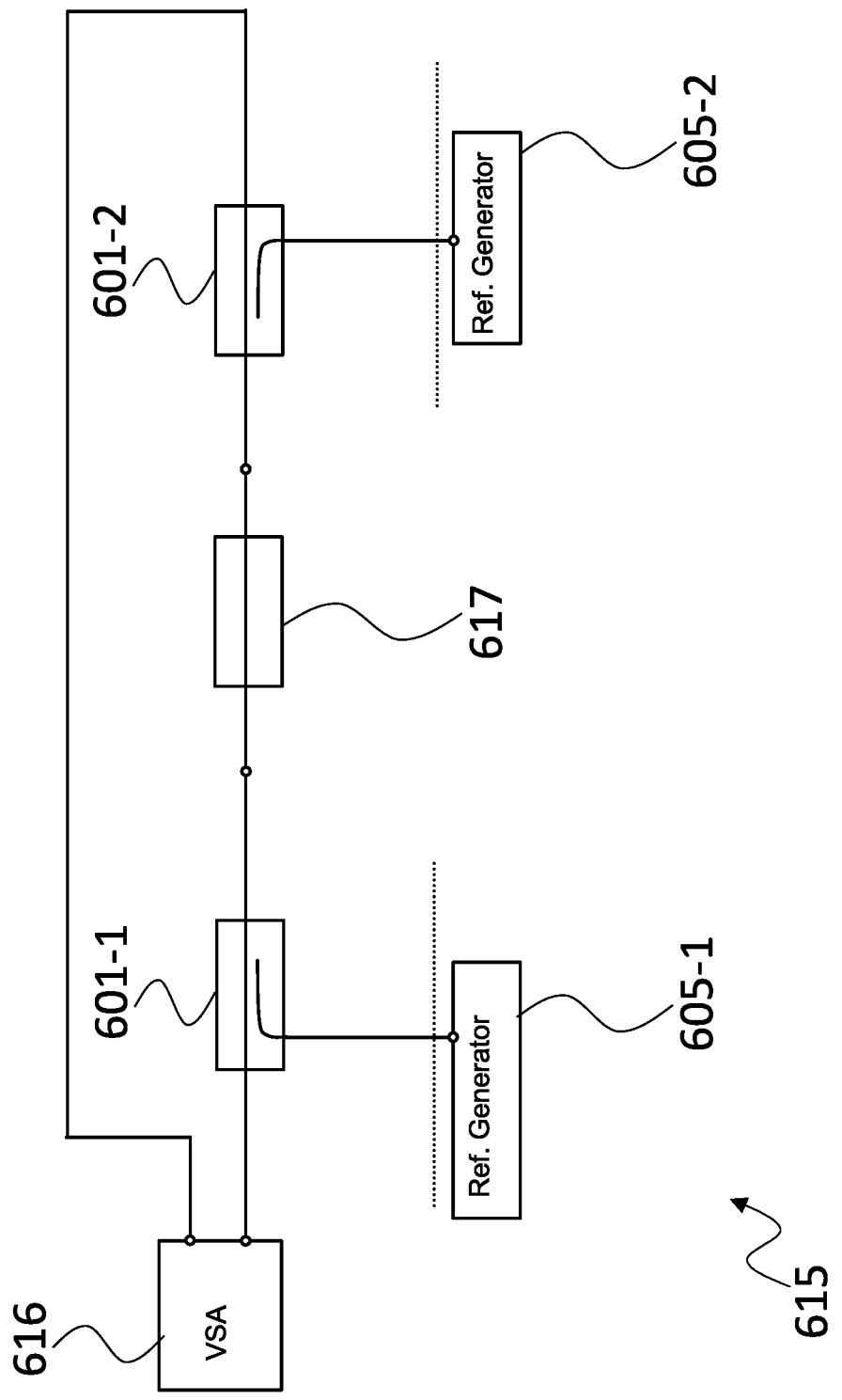
FIG. 6 shows a block diagram of an embodiment of another measurement system according to the present disclosure.

FIG. 6 shows a block diagram of a further measurement system 615. The measurement system 615 is based on the measurement system 515. Therefore, the measurement system 615 comprises a vector signal analyzer 616 with two input ports. Each one of the two input ports of the vector signal analyzer 616 is coupled to a coupling element 601-1, 601-2. The direct connection through the coupling element 601-1, 601-2 is in each case coupled to one of two opposite connections of the same calibration standard 617 of type "though", also called "through calibration standard". The coupling connection of the coupling elements 601-1, 601-2 is in each case coupled to a reference generator 605-1, 605-2 that forms a known signal generator for the measurement system 615. The explanations provided above regarding the measurement system 515 apply mutatis mutandis to the measurement system 615.

The through calibration standard 617 couples the two output ports to each other and allows providing a known calibration signal from the reference generator 605-1 to the coupling element 601-2 and the respective port of the vector signal analyzer 616, or from the reference generator 605-2 to the coupling element 601-1 and the respective port of the vector signal analyzer 616.

With the through calibration standard 617 a full UOSM or TOSM calibration may be performed to calibrate the signal measurement paths.

Figure 7:
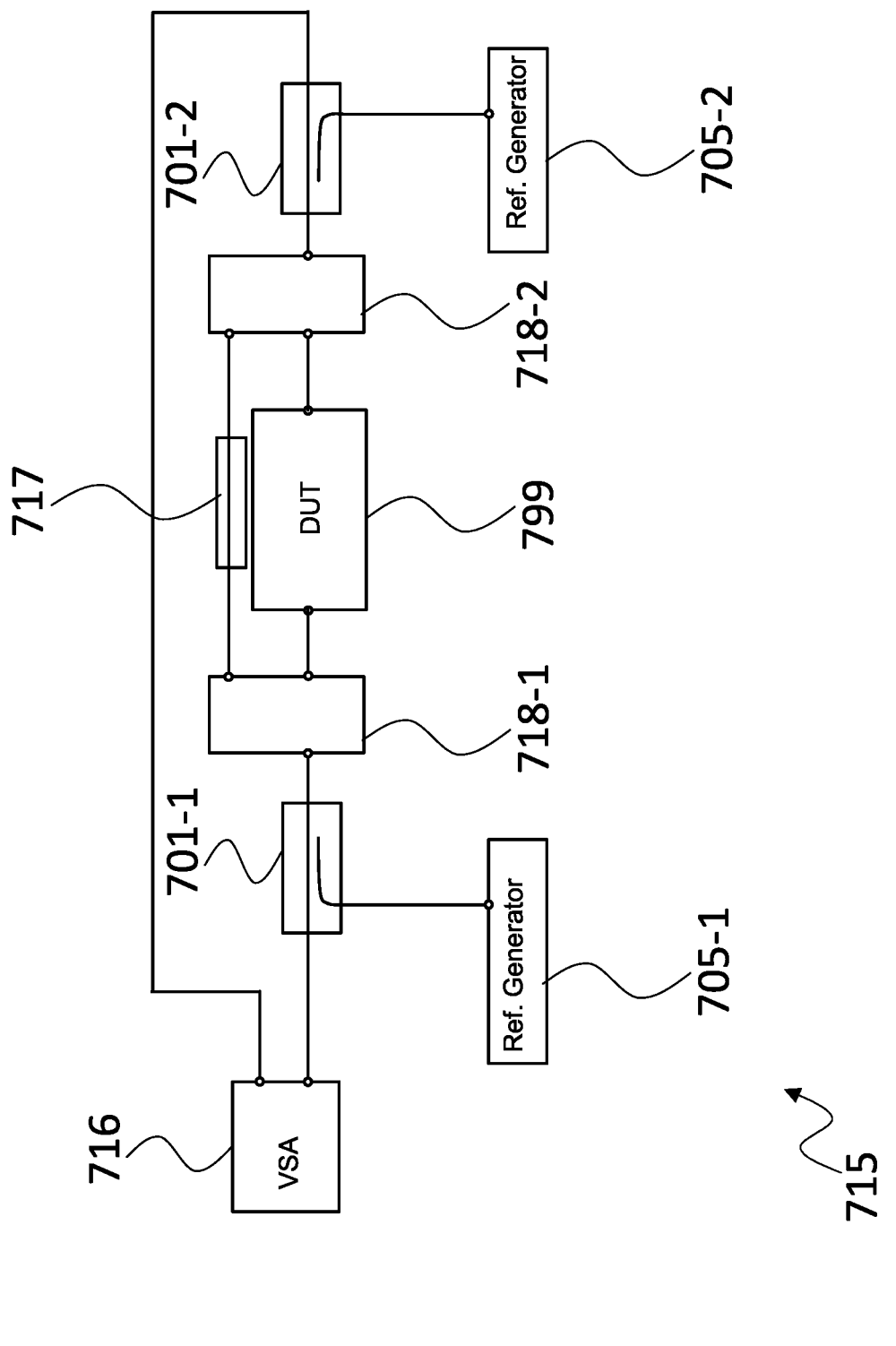
FIG. 7 shows a block diagram of an embodiment of another measurement system according to the present disclosure.

FIG. 7 shows a block diagram of a further measurement system 715. The measurement system 715 is based on the measurement system 615. Therefore, the measurement system 715 comprises a vector signal analyzer 716 with two input ports. Each one of the two input ports of the vector signal analyzer 716 is coupled to a coupling element 701-1, 701-2. The direct connection through the coupling element 701-1, 701-2 is in each case coupled to one of two opposite connections of the same calibration standard 717 of type "though", also called "through calibration standard 717". The coupling connection of the coupling elements 701-1, 701-2 is in each case coupled to a reference generator 705-1, 705-2 that forms a known signal generator for the measurement system 715. The explanations provided above regarding the measurement system 615 apply mutatis mutandis to the measurement system 715.

In the measurement system 715 the coupling elements 701-1, 701-2 are not coupled directly to the through calibration standard 717. Instead, between each one of the coupling elements 701-1, 701-2 and the through calibration standard 717 an inline calibration unit 718-1, 718-2 is provided.

The inline calibration units 718-1, 718-2 may couple the respective coupling element 701-1, 701-2 either to the through calibration standard 717 or to the DUT 799. In addition, the inline calibration units 718-1, 718-2 may comprise further built-in calibration standards, like an open, a short, and a match calibration standard.

The inline calibration units 718-1, 718-2 may comprise a respective switching matrix that may be controlled electronically or manually.

With the inline calibration units 718-1, 718-2 all calibrations may be performed without the need to connect specific calibration standards to the measurement setup. The DUT 799 may also be provided in the measurement setup, while the calibration is performed. The inline calibration units 718-1, 718-2 may be electronically controlled e.g., via the vector signal analyzer 716. Alternatively, the inline calibration units 718-1, 718-2 may be manually controlled.

The inline calibration units 718-1, 718-2 may stay in the measurement setup while a DUT 799 is tested. Therefore, with the inline calibration units 718-1, 718-2 the cabling effort is significantly reduced.

Figure 8:
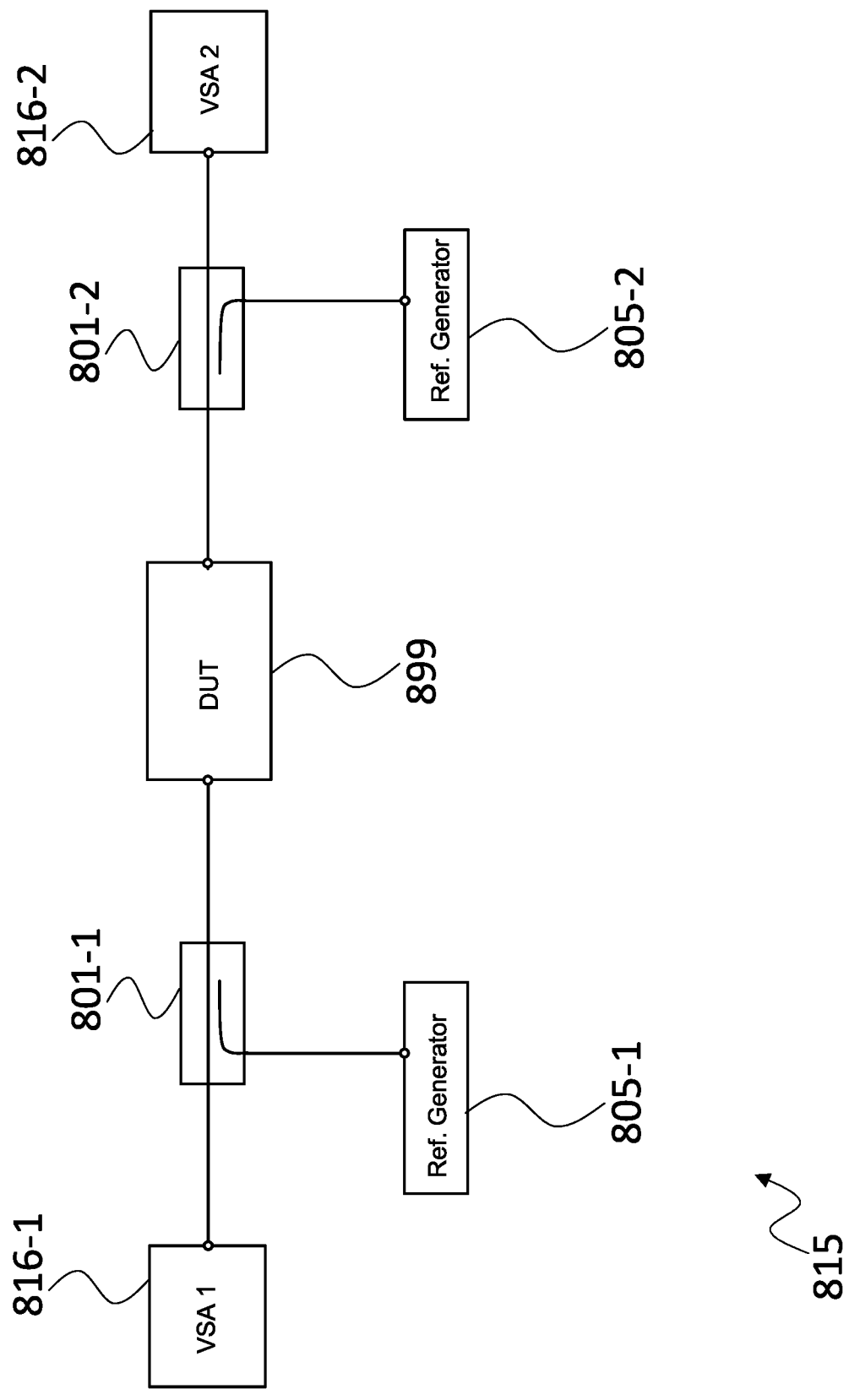
FIG. 8 shows a block diagram of an embodiment of another measurement system according to the present disclosure.

FIG. 8 shows a block diagram of a further measurement system 815. The measurement system 815 is based on the measurement system 515 but comprises two separate vector signal analyzers 816-1, 816-2 instead of a single vector signal analyzer 516 with two input ports. Each one of the two vector signal analyzers 816-1, 816-2 is coupled to a respective coupling element 801-1, 801-2. The direct connection through the coupling elements 801-1, 801-2 is in each case coupled to one of two connections of the same DUT 899. The coupling connection of the coupling elements 801-1, 801-2 is in each case coupled to a reference generator 805-1, 805-2 that forms a known signal generator for the measurement system 815. The explanations provided above regarding the measurement system 515 apply mutatis mutandis to the measurement system 815.

The measurement system 815 maybe used with any of the calibration standards and inline calibration units explained above or below to calibrate the signal measurement paths between the vector signal analyzers 816-1, 816-2 and the DUT 899. In fact, the only difference between the measurement system 515, 615, 715 is that two separate vector signal analyzers 816-1, 816-2 are provided. Of course, the two separate vector signal analyzers 816-1, 816-2 may be communicatively coupled to each other or to a central control unit for controlling the vector signal analyzers 816-1, 816-2 while calibrating the signal measurement paths and while performing measurements with the DUT 899.

Figure 9:
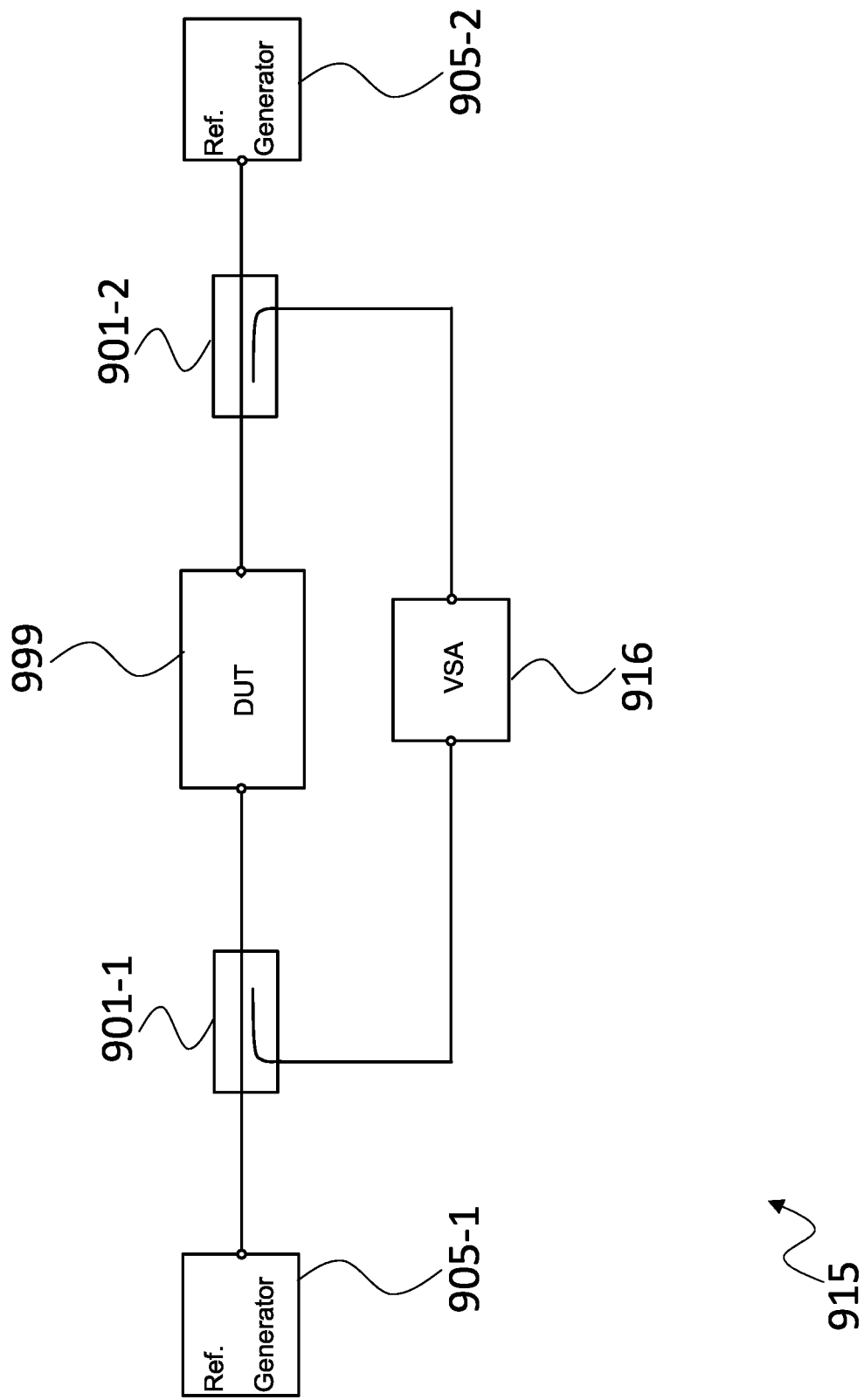
FIG. 9 shows a block diagram of an embodiment of another measurement system according to the present disclosure.

FIG. 9 shows a block diagram of a further measurement system 915. The measurement system 915 is based on the measurement system 515. Therefore, the measurement system 915 comprises a vector signal analyzer 916 with two input ports. Each one of the two input ports of the vector signal analyzer 916 is coupled to a coupling element 901-1, 901-2. In contrast to the measurement system 515, the direct connection through the coupling elements 901-1, 901-2 of the measurement system 915 in each case couples a reference generator 905-1, 905-2 that forms a known signal generator for the measurement system 915 to a DUT 999.

In the measurement system 915 the signal measurement path is, of course, also formed between the DUT 999 and the vector signal analyzer 916, but indirectly via the coupling elements 901-1, 901-2. The direct path in the coupling elements 901-1, 901-2 is instead used by the reference generators 905-1, 905-2 to couple in the respective known calibration signals into the signal measurement paths.

It is understood, that the indirect coupling of the vector signal analyzer 916 to the DUT 999 may be combined with any of the above or below presented embodiments of possible measurement systems. For example, two vector signal analyzers may be present, or the inline calibration units may be used in the measurement system 915.

Figure 10:
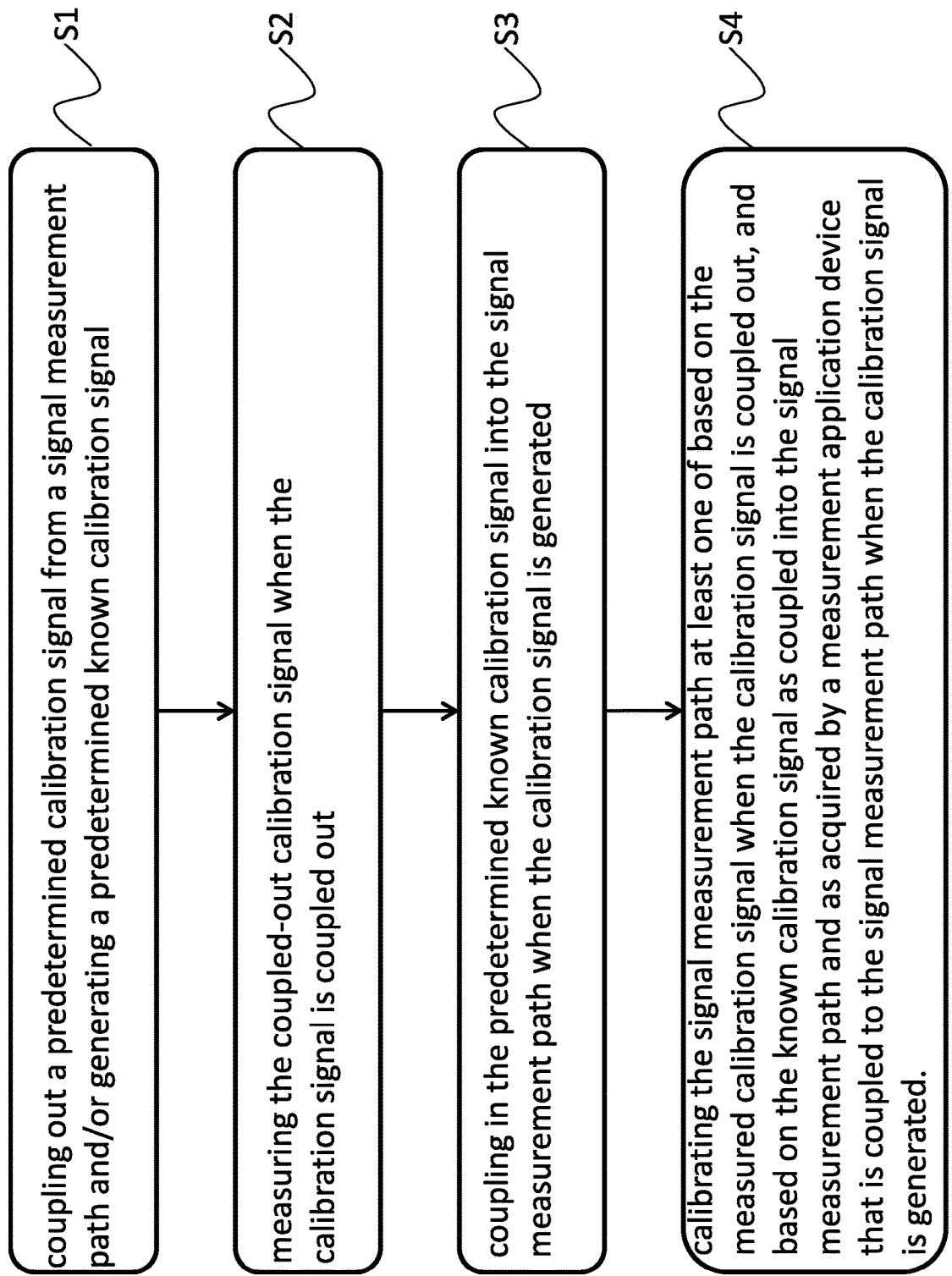
FIG. 10 shows a flow diagram of an embodiment of a method according to the present disclosure.

FIG. 10 shows a flow diagram of a method according to the present disclosure. The method comprises coupling S1 out a predetermined calibration signal from a signal measurement path and/or generating a predetermined known calibration signal, measuring S2 the coupled-out calibration signal when the calibration signal is coupled out, coupling in S3 the predetermined known calibration signal into the signal measurement path when the calibration signal is generated, and calibrating S4 the signal measurement path at least one of based on the measured calibration signal when the calibration signal is coupled out, and based on the known calibration signal as coupled into the signal measurement path and as acquired by a measurement application device that is coupled to the signal measurement path when the calibration signal is generated.

In order to perform a full calibration over a wide frequency range, when the calibration signal is coupled into the signal measurement path, a comb generator may generate the predetermined known calibration signal, and a wideband signal acquisition device may receive the predetermined known calibration signal. When the calibration signal is coupled out from the signal measurement path, a known wideband signal acquisition device may receive the predetermined calibration signal, and a signal generator may generate the predetermined calibration signal.

Calibrating the signal measurement path may comprise determining S-parameters of an error network of the signal measurement path based on signals acquired while three different calibration standards are consecutively coupled to the respective signal measurement path at the reference plane. The three different calibration standards may especially comprise an open calibration standard, and a short calibration standard, and a matched calibration standard.

Calibrating may comprise calibrating at least two signal measurement paths. In each case two of the signal measurement paths may be coupled to each other via a further calibration standard, like a through calibration standard or an unknown calibration standard. In this case, calibrating may further comprise determining S-parameters of an error network of the respective two signal measurement paths based on signals acquired while the two signal measurement paths are coupled to each other via a through calibration standard.

Figure 11:
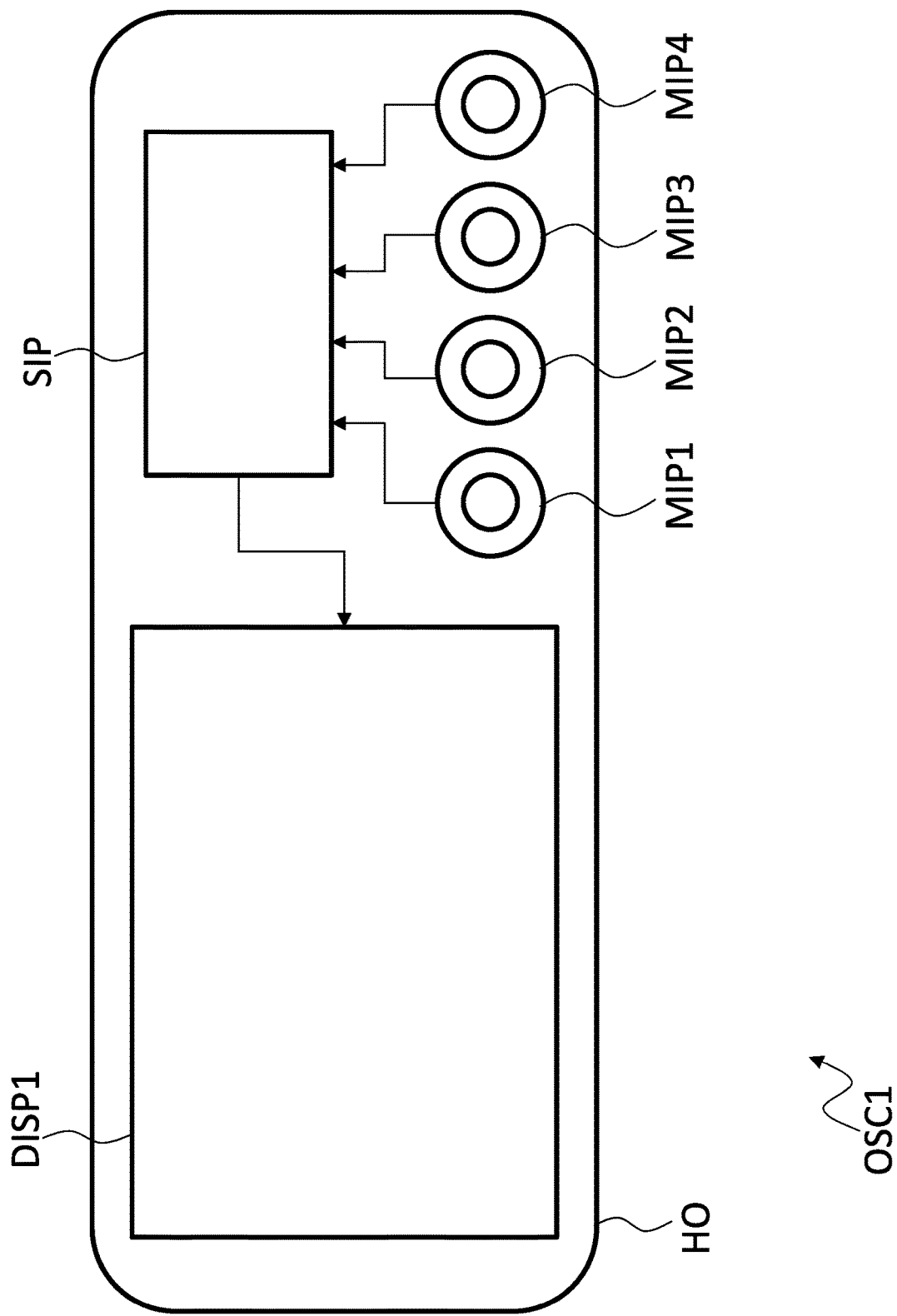
FIG. 11 shows a block diagram of an oscilloscope for use as an embodiment of a measurement application device according to the present disclosure.

FIG. 11 shows a block diagram of an oscilloscope OSC1 that may be used in an embodiment of a measurement system according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user. The shown oscilloscope OSC1 may be used for example, on the DUT output side as a measurement instrument.

In embodiments, the oscilloscope OSC1 may also comprise a signal generator and may be used on the DUT input side in a measurement system.

It is understood, that any calculations that need to be performed according to the present disclosure, may for example be performed by the signal processor SIP. In order to receive the required data at the signal processor SIP, the oscilloscope OSC1 may also comprise respective communication means that allow the oscilloscope OSC1 to communicate for example, with a reference receiver or a known signal generator.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

| | |
|---|---|
| 100, 200 | measurement application device calibration unit |
| 101, 201, 301, 401, 501-1, 502-2 601-1, 602-2, 701-1, 702-2, 801-1, 802-2 | coupling element coupling element |
| 901-1, 902-2 | coupling element |
| 102, 202 | first connection |
| 103, 203 | second connection |
| 104, 204 | third connection |
| 105, 205, 305, 405, 505-1, 505-2 | signal processing device |
| 605-1, 605-2, 705-1, 705-2, 805-1, 805-2 | signal processing device |
| 905-1, 905-2 | signal processing device |
| 106, 206 | connector |
| 107, 207, 307, 407 | reference plane |
| 507-1, 507-2, 507-3, 507-4 | reference plane |
| 108, 308 | predetermined calibration signal |
| 209, 409 | known calibration signal |
| 110, 210 | signal measurement path |
| 315, 415, 515, 615, 715, 815, 915 | measurement system |
| 316, 416, 516, 616, 716, 816-1, 816-2 | measurement application device |
| 916 | measurement application device |
| 317, 417, 517-1, 517-2, 617, 717 | calibration standard |
| 718-1, 718-2 | inline calibration unit |
| 799, 899, 999 | DUT |
| OSC1 | oscilloscope |
| HO | housing |
| MIP1, MIP2, MIP3, MIP4 | measurement input |
| SIP | signal processing |
| DISP1 | display |

What is claimed is:

1. A measurement application device calibration unit, comprising:
    at least one coupling element comprising:
        a first connection and a second connection for coupling the coupling element into a signal measurement path that is coupled to a measurement application device; and
        a third connection,
        wherein the coupling element is configured to at least one of couple out a signal from the signal measurement path into the third connection, and couple in a signal from the third connection into the signal measurement path; and
    a signal processing device that is coupled to the third connection of the coupling element and that is configured:
        to receive a predetermined calibration signal when the coupling element couples out a signal from the signal measurement path into the third connection; and
        to generate a predetermined known calibration signal when the coupling element couples in a signal from the third connection into the signal measurement path,
    wherein the measurement application device calibration unit comprises a comb generator configured to generate the predetermined known calibration signal as a known signal generator.

2. The measurement application device calibration unit according to claim 1, wherein the signal processing device comprises:
    a reference receiver configured to receive the predetermined calibration signal when the coupling element couples out a signal from the signal measurement path into the third connection; and
    a known signal generator configured to generate the predetermined known calibration signal when the coupling element couples in a signal from the third connection into the signal measurement path.

3. A measurement system, comprising:
    at least one measurement application device;
    at least one signal measurement path from at least one of the measurement application devices to a respective reference plane; and
    a measurement application device calibration unit, the measurement application device calibration unit being configured to, with respect to a predetermined calibration signal, at least one of couple out the predetermined calibration signal from the respective signal measurement path and measure the predetermined calibration signal, and generate the predetermined calibration signal as a predetermined known calibration signal and couple in the predetermined known calibration signal into the respective signal measurement path, wherein the measurement application device calibration unit comprises a comb generator configured to generate the predetermined known calibration signal as a known signal generator, wherein the measurement application device is configured to calibrate the signal measurement path based on:
the predetermined calibration signal as measured by the measurement application device calibration unit; or
the predetermined known calibration signal as coupled into the signal measurement path by the measurement application device calibration unit and measured by the measurement application device.

4. The measurement system of claim 3, wherein the measurement application device calibration unit comprises:
at least one coupling element comprising:
a first connection and a second connection for coupling the coupling element into a signal measurement path that is coupled to a measurement application device; and
a third connection,
wherein the coupling element is configured to at least one of couple out a signal from the signal measurement path into the third connection, and couple in a signal from the third connection into the signal measurement path; and
a signal processing device that is coupled to the third connection of the coupling element and that is configured:
to receive a predetermined calibration signal when the coupling element couples out a signal from the signal measurement path into the third connection; and
to generate a predetermined known calibration signal when the coupling element couples in a signal from the third connection into the signal measurement path.

5. The measurement system of claim 4, wherein the signal processing device comprises:
a reference receiver configured to receive the predetermined calibration signal when the coupling element couples out a signal from the signal measurement path into the third connection; and
a known signal generator configured to generate the predetermined known calibration signal when the coupling element couples in a signal from the third connection into the signal measurement path.

6. The measurement system according to claim 3, wherein when the calibration signal is coupled into the signal measurement path by the measurement application device calibration unit, the known calibration signal comprises a signal with known magnitudes and phases in a predetermined frequency range, especially a comb signal, and the measurement application device comprises a wideband signal acquisition device configured to receive the predetermined known calibration signal, and
wherein when the calibration signal is coupled out from the signal measurement path by the measurement application device calibration unit, the measurement application device calibration unit comprises a known wideband signal acquisition device configured to receive the predetermined calibration signal, and the measurement application device comprises a signal generator configured to generate the predetermined calibration signal.

7. The measurement system according to claim 3, comprising three different calibration standards, the different calibration standards including an open calibration standard, a short calibration standard, and a matched calibration standard for each one of the signal measurement paths,
wherein the at least one measurement application device is configured to determine S-parameters of an error network of the respective signal measurement path based on signals acquired while the three different calibration standards are consecutively coupled to the respective signal measurement path at the reference plane.

8. The measurement system according to claim 7, comprising at least two signal measurement paths and one measurement application device calibration unit for each one of the signal paths,
wherein in each case two of the signal measurement paths are coupled to each other via a further calibration standard, and
wherein the at least one measurement application device is configured to determine S-parameters of an error network of the respective two signal measurement paths based on signals acquired while the two signal measurement paths are coupled to each other via a through calibration standard.

9. The measurement system according to claim 3, wherein at least one of the signal measurement paths couples a port of the respective measurement application device with the reference plane via a direct transmission line, and wherein the respective measurement application device calibration unit at least one of couples out a signal from the direct transmission line via a coupling element, and couples in a signal into the direct transmission line via the coupling element.

10. The measurement system according to claim 3, wherein at least one of the signal measurement paths couples a port of the respective measurement application device with the reference plane via a coupling element, and wherein the respective measurement application device calibration unit at least one of couples out a signal from the signal measurement path via a direct transmission line to the reference plane, and couples in a signal into the signal measurement path via the direct transmission line to the reference plane.

11. The measurement system according to claim 3, wherein the at least one measurement application device is configured to perform a noise figure measurement, especially using a cold source method.

12. A method, comprising:
coupling out a predetermined calibration signal from a signal measurement path and/or generating a predetermined known calibration signal;
measuring the coupled-out calibration signal when the calibration signal is coupled out;
coupling in the predetermined known calibration signal into the signal measurement path when the calibration signal is generated; and
calibrating the signal measurement path at least one of based on the measured calibration signal when the calibration signal is coupled out, and based on the known calibration signal as coupled into the signal measurement path, as reflected by a reference plane, and as acquired by a measurement application device that is coupled to the signal measurement path when the calibration signal is generated, wherein the predetermined known calibration signal is generated by a comb generator configured to generate the predetermined known calibration signal as a known signal generator.

13. The method according to claim 12,
wherein when the calibration signal is coupled into the signal measurement path, the known calibration signal comprises a signal with known magnitudes and phases in a predetermined frequency range, especially a comb signal, and a wideband signal acquisition device receives the predetermined known calibration signal, and
wherein when the calibration signal is coupled out from the signal measurement path, a known wideband signal acquisition device receives the predetermined calibration signal, and a signal generator generates the predetermined calibration signal.

14. The method according to claim 12, wherein calibrating the signal measurement path comprises determining S-parameters of an error network of the signal measurement path based on signals acquired while three different calibration standards are consecutively coupled to the respective signal measurement path at the reference plane;
the three different calibration standards especially comprising an open calibration standard, and a short calibration standard, and a matched calibration standard.

15. The method according to claim 14, wherein calibrating comprises calibrating at least two signal measurement paths,
wherein in each case two of the signal measurement paths are coupled to each other via a further calibration standard, and
wherein calibrating further comprises determining S-parameters of an error network of the respective two signal measurement paths based on signals acquired while the two signal measurement paths are coupled to each other via a through calibration standard.

* * * * *